United States Patent [19]
Kalkunte et al.

[11] Patent Number: 6,108,306
[45] Date of Patent: Aug. 22, 2000

[54] APPARATUS AND METHOD IN A NETWORK SWITCH FOR DYNAMICALLY ALLOCATING BANDWIDTH IN ETHERNET WORKGROUP SWITCHES

[75] Inventors: Mohan Kalkunte, Sunnyvale; Jayant Kadambi, Milpitas; Shashank Merchant, Sunnyvale, all of Calif.

[73] Assignee: Advanced Micro Devices, Inc., Sunnyvale, Calif.

[21] Appl. No.: 08/908,593

[22] Filed: Aug. 8, 1997

[51] Int. Cl.[7] .............................. H04J 3/17; H04L 12/56
[52] U.S. Cl. ..................... 370/235; 370/422; 370/468; 370/477
[58] Field of Search .................... 370/229, 252, 370/253, 235, 236, 389, 428, 429, 449, 445, 468, 477, 422

[56] References Cited

U.S. PATENT DOCUMENTS

| | | | |
|---|---|---|---|
| 4,771,391 | 9/1988 | Blasbalg | 709/232 |
| 4,926,415 | 5/1990 | Tawara et al. | 370/231 |
| 5,319,641 | 6/1994 | Fridrich et al. | 370/447 |
| 5,353,287 | 10/1994 | Kuddes et al. | 370/448 |
| 5,404,353 | 4/1995 | Ben-Michael et al. | 370/235 |
| 5,418,784 | 5/1995 | Ramakrishnan et al. | 370/445 |
| 5,422,887 | 6/1995 | Diepstraten et al. | 370/448 |
| 5,436,903 | 7/1995 | Yang et al. | 370/448 |
| 5,526,355 | 6/1996 | Yang et al. | 370/448 |
| 5,602,829 | 2/1997 | Nie et al. | 370/235 |
| 5,675,732 | 10/1997 | Majeti et al. | 370/229 |
| 5,748,629 | 5/1998 | Caldara et al. | 370/389 |
| 5,748,901 | 5/1998 | Afek et al. | 370/229 |
| 5,784,358 | 7/1998 | Smith et al. | 370/230 |
| 5,838,681 | 11/1998 | Bonomi et al. | 370/395 |
| 5,907,556 | 5/1999 | Hisanaga et al. | 370/468 |
| 5,912,889 | 6/1999 | Preas et al. | 370/359 |

FOREIGN PATENT DOCUMENTS

0632621  4/1995  European Pat. Off. .

OTHER PUBLICATIONS

Comer, D.E., et al., "A Rate–Based Congestion Avoidance and Control Scheme for Packet Switched Networks," Proc. of the International Conference on Distributed Computing Systems, Paris, May 28–Jun. 1, 1990, Conf. 10, May 28, 2990, IEEE, pp. 390–397.

(List continued on next page.)

*Primary Examiner*—Hassan Kizou
*Assistant Examiner*—Saba Tsegaye

[57] ABSTRACT

A network switch having switch ports for full-duplex communication of data packets with respective network nodes according to IEEE 802.3 protocol dynamically allocates bandwidth between the switch ports based upon detected activity from the network nodes. The network switch generates an assigned bandwidth value for each active switch port based upon the switch capacity and the number of active switch ports. Each active switch port forwards the assigned bandwidth value to the corresponding network node as an IEEE 802.3x[2] compliant media access control (MAC) control frame, enabling the corresponding network node to calculate its programmed interpacket gap interval following a packet transmission based upon the size of the transmitted packet and the assigned bandwidth. Each active switch port also calculates the programmed interpacket gap to determine if reception of another data packet has begun by the end of the programmed interpacket gap interval. If no data packet is received by the corresponding port after the programmed interpacket gap interval, the network switch considers that switch port as non-active, recalculates, and reassigns the unused bandwidth to the remaining active ports. The dynamic bandwidth allocation by the network switch enables the input buffer size to be optimized without requiring an excessive switch bandwidth.

11 Claims, 5 Drawing Sheets

OTHER PUBLICATIONS

Williamson, C.L., et al., "Loss–Load Curves: Support for Rate–Based Congestion Control in High–Speed Datagram Networks," Proc. of the Conference on Communications Architectures and Protocols (SIGCOMM), Zurich, Sep. 3–6, 1996, vol. 21, No. 4, Sep. 3, 1991, Assn. for Computing Machinery, pp. 17–28.

Pouzin, Louis, "Methods, Tools and Observations on Flow Control in Packet–Switched Data Networks," IEEE Trans. on Communications, vol. 29, No. 4, Apr. 1981, New York, pp. 413–426.

Gerla, M. et al., "Congestion Control in Interconnected LANS," IEEE Network, vol. 2, No. 1, Jan. 2, 1988, New York, pp. 72–76.

AMD, AM79C971 PCnet™–Fast Single–Chip Full–Duplex 10/100 mbps Ethernet Controller for PCl Local Busm Preliminary Data Sheet Publication #20550, Rev. B, May, 1996.

Internet Message to: stds–802–3–hssg.ieee.org from Alakd@aol.com, subject "IPG Issues", Aug. 27, 1996.

Internet Message to: Alakd@aol.com, stds–802–3–hssg@ieee.org from mart@CS.UCR.edu, subject "IPG Issues", Aug. 27, 1996.

Johnson, "Fast Ethernet: Dawn of a New Network," Prentice–Hall, Inc (1996), pp. 158–175.

Breyer et al., "Switched and Fast Ethernet: How It Works and How to Use It", Ziff–Davis Press, Emeryville, CA (1995), pp. 60–70.

APPARATUS AND METHOD IN A NETWORK SWITCH FOR DYNAMICALLY ALLOCATING BANDWIDTH IN ETHERNET WORKGROUP SWITCHES

CROSS-REFERENCE TO RELATED APPLICATION

Commonly assigned, copending applications Ser. No. 08/706,317, filed Aug. 30, 1996, entitled "ARRANGEMENT FOR REGULATING PACKET FLOW RATE IN SHARED-MEDIUM, POINT-TO-POINT, AND SWITCHED NETWORKS" and 08/766,565, filed Dec. 13, 1996, entitled "METHOD AND APPARATUS FOR REGULATING DATA FLOW IN NETWORKS".

BACKGROUND OF THE INVENTION

Technical Field

The present invention relates to networks and more particularly, to methods and systems controlling network data traffic in a full-duplex switched network operating according to Ethernet (IEEE 802.3) protocol.

Background Art

Switched local area networks use a network switch for supplying data frames between network stations or other network nodes (such as routers or gateways), where each network node is connected to the network switch by a media. The switched local area network architecture uses a media access control (MAC) enabling a network interface within each network node and the network switch and the network node to access the media. The network switch passes data frames received from a transmitter node to a destination node based on the header information and the received data frame, including source address and destination address.

One difficulty in designing switched networks involves determining the appropriate size of first in, first out (FIFO) buffers in network switch ports. In general, an increase in FIFO size at each network switch port will improve the throughput and delay performance of the switch, but at the expense of an increased switch port cost. Conversely, reduction in the size of the FIFO at each network switch port may result in performance degradation at the network switch, resulting in lost data packets.

Flow control has been proposed to reduce network congestion where a transmitting node temporarily suspends transmission of data packets. A proposed flow control arrangement for a full-duplex environment, referred to as IEEE 802.3x[2], specifies generation of a flow control message, for example a PAUSE frame. A transmitting node that receives the PAUSE frame enters a pause state and holds transmission for a time interval specified in the PAUSE frame.

The disclosed flow control proposals, however, reduce the effective bandwidth of the network media. For example, if a full-duplex receiving network element (e.g., a network switch port) repeatedly sends PAUSE frames specifying small pause intervals to a transmitting end station, the effective bandwidth of the media is reduced due to the transmission of a plurality of 64-byte PAUSE messages instead of data. Network throughput may also be reduced if the specified pause interval is too long, where the transmitting station may remain in an idle condition after the receiving station (i.e., the switch transmitting the PAUSE message) has eliminated the congestion. Data loss may also occur if data packets are sent by the transmitting station after generation of the PAUSE frame by the receiving station. For example, the transmitting station may send a number of data packets before receipt of the PAUSE frame due to propagation delays between the transmitting and receiving stations.

One arrangement for dynamically serving all the input ports of a network switch uses a round-robin scheme, where the network switch sequentially processes each network switch port either equally or according to a weighted allocation to read the received data packet from the corresponding input FIFO. However, this arrangement still does not control the flow of data packets into the input FIFOs of the respective network switch ports. Hence, the input FIFO for each network switch port needs to be sized depending on the instantaneous burst load and the length of the burst.

An alternative arrangement for mitigating input FIFO sizes is to increase the switch bandwidth, so that the overall bandwidth of the network switch is greater than the number of ports multiplied by the maximum load on each port. Such an arrangement, however, requires that the bandwidth increases linearly with the number of ports and the port speed.

DISCLOSURE OF THE INVENTION

There is a need for an arrangement in a network switch for dynamically allocating bandwidth in network switch ports that enable the size of network switch port buffers to be optimally sized without increasing switch bandwidth.

There is also a need for an arrangement in a network switch for controlling transmission of data packets by a network node in a manner that minimizes unused capacity of the switch.

There is also a need for an arrangement for dynamically allocating network switch resources based on the relative activity by network nodes and communication with the network switch.

These and other needs are attained by the present invention, where switch bandwidth is selectively allocated between network switch ports based on detection of active ports among the network switch ports.

According to one aspect of the present invention, a method in a network switch having network ports of controlling transmission of data packets by network stations includes detecting active ports among the network ports, determining assigned bandwidth values for the respective active ports based on a number of the active ports and a capacity of the network switch, and outputting the assigned bandwidth values to the network nodes served by the respective active ports, the output assigned bandwidth values causing the network stations served by the respective active output ports to operate according to the respective assigned bandwidth values. Each of the network nodes receiving the assigned bandwidth values are configured for dynamically adjusting their respective delay times between packet transmissions based upon the size of the transmitted data packet and the corresponding assigned bandwidth from the network switch. Hence, the required size of an input FIFO in a network switch port can be reduced by sending assigned bandwidth values to the corresponding network node, causing the rate control to be performed at the transmitting network node. Moreover, the dynamically-assigned bandwidth values are based upon the number of active ports and the capacity of the network switch, minimizing the unused capacity of the network switch.

Another aspect of the present invention provides a method in a network switch including monitoring switch ports in the network switch for data packets received from the respective network nodes, selectively determining a group of the switch ports to be designated as active ports based on the monitoring of the data packets, and selectively allocating switch bandwidth among the active ports based on a number of the active ports and a capacity of the network switch. The selective determination of switch ports designated as active ports enables the switch bandwidth to be dynamically allocated based on activity by the corresponding network nodes, enabling each active port to obtain the maximum available bandwidth. Moreover, the selective allocation of switch bandwidth enables unused bandwidth to be distributed to active ports, while maintaining quality of service for any priority nodes requiring a guaranteed access latency.

Still another aspect of the present invention provides a network switch comprising a plurality of network ports configured for sending and receiving data frames with respective network nodes, a receive buffer configured for storing a data frame received from at least one of the network ports, the network switch configured for outputting the stored data frame to a selected one of the network ports according to a prescribed switch capacity, and a controller configured for determining assigned bandwidth values for respective selected network ports, designated as active ports, based on activity detected on the network ports and the prescribed switch capacity.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
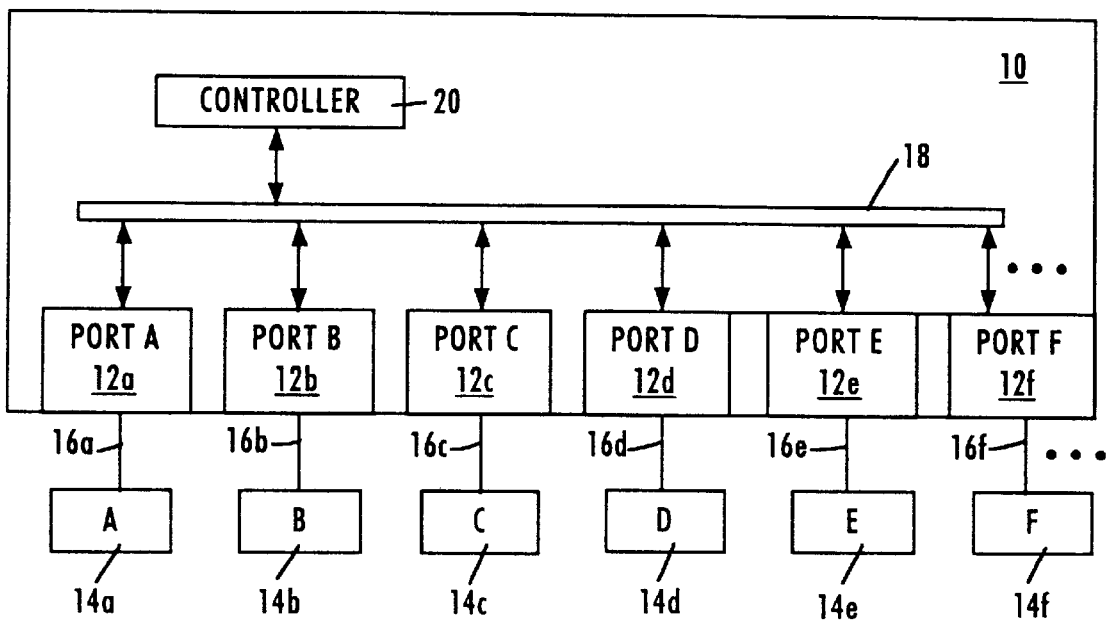
FIG. 1 is a block diagram illustrating a network switch having network ports in communication with respective network nodes according to an embodiment of the present invention.

FIG. 1 is a block diagram illustrating a network switch 10 having a plurality of network switch ports 12 for communication with respective network nodes 14 according to an embodiment of the present invention. Each of the switch ports 12 communicate with the corresponding network node 14 (e.g., a network station, a router, another network switch, etc.) via a corresponding network media 16 providing a point-to-point, full-duplex IEEE 802.3x link. The media 16 may be either fiber optic or twisted pair wire, and hence may couple the port 12 to the corresponding node 14 using, for example 10BASE-T, 100BASE-2, 100BASE-TX, 100BASE-T4, or 100BASE-FX media. The switch port 12 and the corresponding node 14 may transmit data packets at 10 megabits per second (Mb/s), 100 Mb/s or 1000 Mb/s according to IEEE 802.3x full-duplex protocol.

Each network switch port 12 is configured to send a MAC control frame to the corresponding node 14. According to the current IEEE.802.3x revision 1.0 full-duplex draft, only one MAC control frame is currently specified by IEEE 802.3x[2], namely the PAUSE frame.

As described below, the MAC control frame can be used to supply an assigned bandwidth value, also referred to as a desired transmission rate, from the network switch 10 to the network node 14. The switch 10 determines the assigned bandwidth value for each port 12, and outputs the assigned bandwidth value to the corresponding node 14 as a MAC control frame in accordance with IEEE 802.3x[2] protocol. Once the network node 14 receives the assigned bandwidth value in the MAC control frame from the corresponding port 12 of the switch 10, the network node can transmit data packet to the corresponding port 12 according to as assigned rate. Specifically, the network node 14 dynamically calculates an interframe spacing following each packet transmission (i.e., the interpacket gap) based on the assigned bandwidth and the length of the transmitted packet.

According to the disclosed embodiment, the network switch 10 includes a controller 20 that dynamically allocates bandwidth between the switch ports 12 based upon the capacity of the network switch across a backplane bus 18 switching received data packets, and the number of active ports. Specifically, if one or more of the network switch ports, for example switch port 12a, does not have any received data packet from the corresponding network node 14a to be switched by the network switch 10, the controller 20 reallocates the unused bandwidth from the non-active switch port 12a to other active ports. Hence, the network switch 10 redistributes bandwidth across selected ports 12 when a given port becomes non-active or when a non-active port becomes active, at which point the network switch 10 calculates the bandwidth to be reallocated to each port 12 and sends a MAC control frame to each active port indicating the new assigned rate. The port then sends the MAC control frame to the corresponding network node 14, which changes it interpacket gap according to the new rate. The disclosed arrangement of sending MAC control frames having an assigned rate is particularly effective in 'blocking switches,' where the total switch capacity (C) is less than the number of switch ports (N) multiplied by the perport bandwidth (B).

Figure 3A:
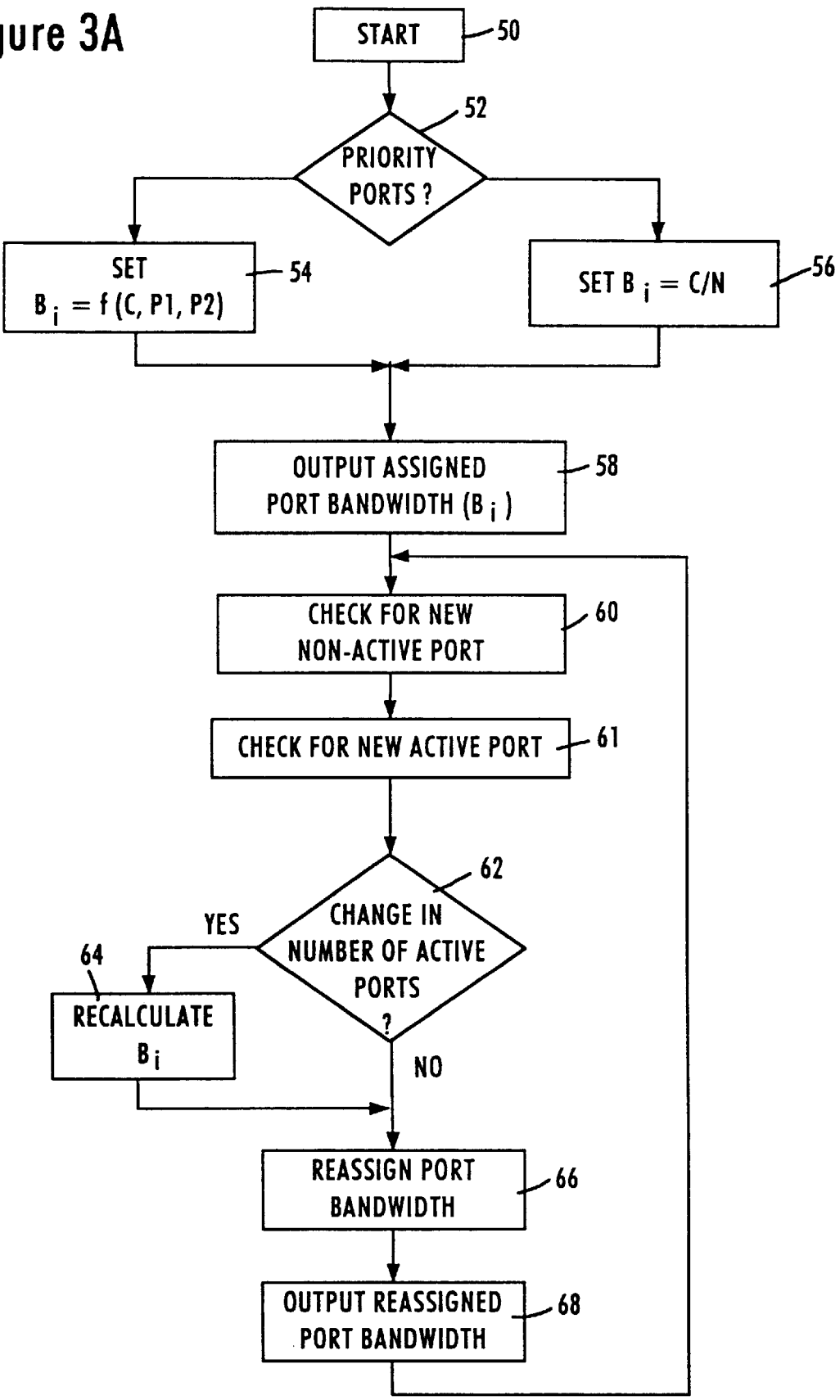
FIGS. 3A and 3B are flow diagrams illustrating methods in a network switch of controlling transmission of data packets by network stations according to first and second embodiments of the present invention, respectively.
Figure 3B:
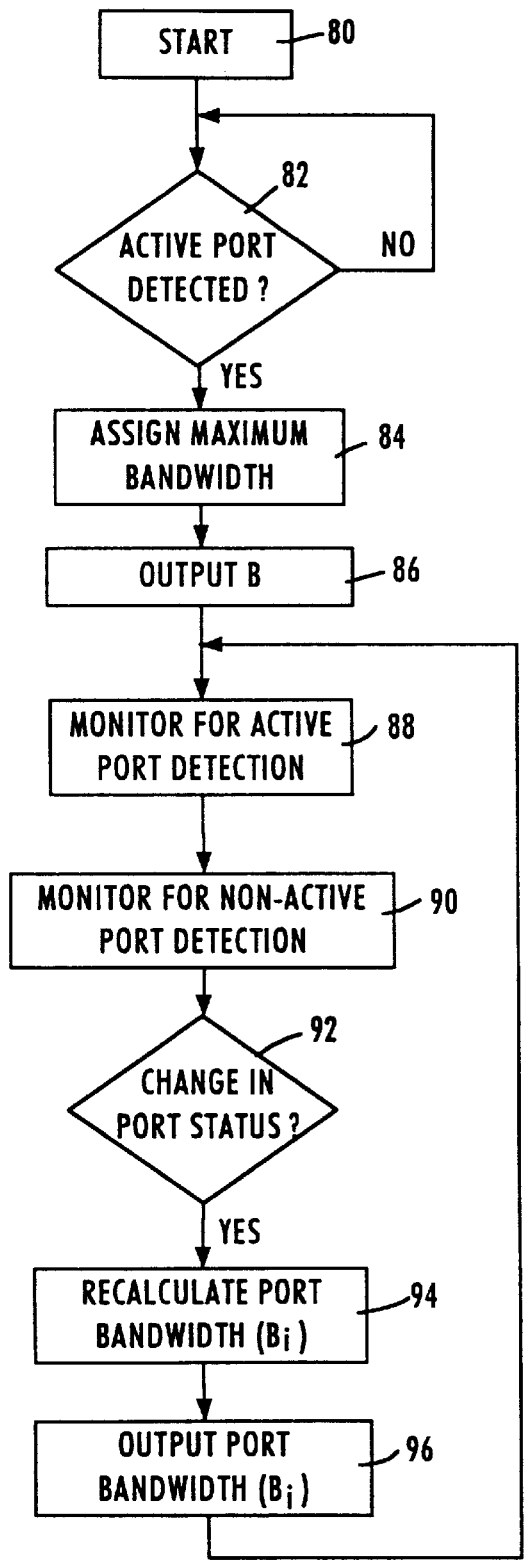

FIGS. 3A and 3B are flow diagrams illustrating a method for controlling transmission of data packets according to first and second embodiments of the present invention. The method of FIG. 3A initially assigns bandwidth to all the network switch ports, whereas the method of FIG. 3B assigns bandwidth only to detected active ports.

As shown in FIG. 3A, the controller 20 initializes the network switch 10 in step 50, and determines in step 52 whether any of the network switch ports 12 are configured as priority nodes. Specifically, the ports 12 may be configured as having equal priority, or alternatively may be configured as higher priority ports serving nodes requiring guaranteed access latency, or lower priority ports. If the controller 20 determines that at least one of the network switch ports 12 is configured as a priority port, the controller 20 allocates bandwidth values for each of the ports in step 54 based upon the capacity of the network switch (C), the number of switch ports having a high priority (P1), and the number of switch ports having low priority (P2).

Unequal bandwidth allocation depends on application bandwidth requirements and priority of the request. For example, an application in a network node 14 requesting a certain bandwidth may be guaranteed bandwidth by reallocating bandwidth among the ports 12 according to a predetermined priority rule. Applications with highest priority will receive the necessary bandwidth, while applications with low priority will be assigned the remaining usable bandwidth. For example, assume the network switch 10 has eight switch ports 12 and a switch capacity of C=300 Mb/s, where each of the eight ports 12 are configured to operate in full-duplex mode at 100 Mb/s on the corresponding media 16. Assume further that network switch port 12a is a priority port that requires a minimum of 25 percent of the capacity of the switch. In such a case, the controller 20 would assign 25 percent of the switch capacity to port 12a (e.g., 0.25C=75 Mb/s), followed by the port 12a outputting a MAC control frame carrying the assigned bandwidth ($B_A$=75 Mb/s) to the corresponding network node 14a. The remaining 75 percent bandwidth (e.g., 225 Mb/s) would be divided equally (e.g., B=225/7=32 Mb/s) among the remaining seven low priority ports 12b, 12c, etc.

Alternatively, if the controller 20 determines in step 52 that there are no priority ports, such that bandwidth can be allocated equally, the controller 20 sets the port bandwidth ($B_i$) equal to the switch capacity (C) divided by the number of network ports (N) in step 56.

After the controller 20 sets the port bandwidth (B) for each of the ports 12, each port 12 outputs the corresponding assigned bandwidth value to the corresponding network node 14 in step 58.

Once each network node 14 receives the corresponding assigned bandwidth value, each node 14 transmits data packet according to the prescribed bandwidth rate. Specifically, each node 14 having a data packet to send will transmit its first data packet (P1) according to a full-duplex Ethernet protocol. The node 14 then calculates a delay time (D1) based upon the assigned bandwidth (B) relative to the network wire rate (e.g., R=100 Mb/s) and the detected size of the first data packet (S), where D1=(S)(R/B-1). The node then waits the determined delay time (D1) before transmitting a second data packet (P2). The duration of the delay time is directly proportional to the size of the transmitted data packet, so long as the delay time is greater than or equal to the minimum interpacket gap of 96 bit times specified by IEEE 802.3 protocol. Hence, if the transmitted data packet has a large size, the delay time (D1) has a longer duration to maintain an overall constant output transmission rate according to the assigned bandwidth (B).

Once the network switch 10 outputs the assigned bandwidth to each of the network nodes 14, the controller 20 begins to monitor the switch ports 12 for data packets received from the respective network nodes 14 in order to determine the presence of new active or new non-active ports. The controller 20 first checks for the presence of a new non-active switch port 12 in step 60, then checks in step 61 for the presence of a new active port. Although FIG. 3A shows steps 60 and 61 performed serially, these steps can be executed simultaneously (i.e., in parallel). In the initial case where all network ports are deemed active, a detection of a non-active port will result in a change in the number of active ports, such that the port bandwidth is recalculated for each of the active ports in step 64. The recalculated port bandwidth is then reassigned in step 66 to the appropriate active ports, and the active ports output the reassigned port bandwidth values (B) in step 68 to the respective network nodes 14.

The controller 20 continues monitoring for new non-active ports in step 60 and active ports in step 61. If a change in the overall number of active switch ports is detected in step 62, the controller 20 recalculates the per-port bandwidth in step 64, reassigns the recalculated port bandwidth to each of the active ports in step 66, and outputs the reassigned port bandwidth as a MAC control frame to the respective network nodes in step 68.

FIG. 3B is a flow diagram illustrating an alternative arrangement for controlling transmission of data packets according to a second embodiment of the present invention. As described above, the arrangement of FIG. 3B assigns bandwidth only to detected active ports. The controller 20 in step 80 begins by initializing its internal configuration registers, and waiting in step 82 for detection of an active port, i.e., a port having received a data packet from a network node 14. Upon detecting in step 82 the first active switch port, the controller 20 assigns the maximum bandwidth to the active port in step 84 equal to the wire rate (e.g., 100 Mb/s) or the total switch capacity (C), whichever is less. The controller 20 then outputs the assigned bandwidth to the active port 12, which outputs a MAC control frame in step 86 to the corresponding network node 14.

The controller 20 then enters a monitoring state, where the controller 20 monitors for active ports in step 88 and non-active ports in step 90. Although shown serially, steps 88 and 90 can be executed in parallel. If in step 92 the controller 20 determines a change in status (e.g., a new active port or a new non-active port), the controller 20 recalculates the bandwidth for the active ports in step 94. Upon receiving the assigned bandwidth values from the controller 20, the active switch ports output the assigned bandwidth values in step 96 to the respective network nodes 14.

Figure 4:
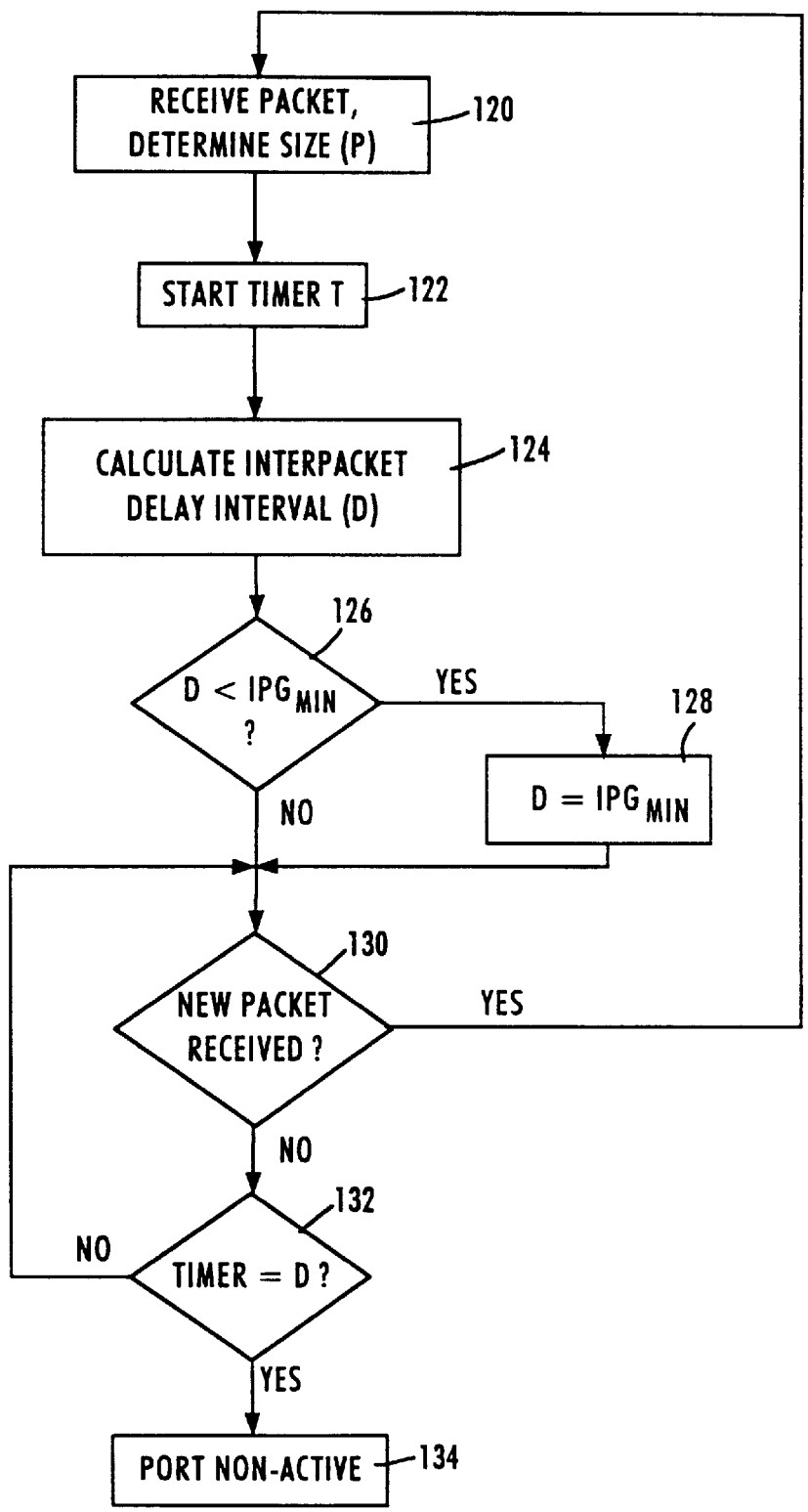
FIG. 4 is a flow diagram illustrating the steps of detecting a non-active switch port.

FIG. 4 is a flow diagram illustrating in detail the method of detecting a non-active port as performed in FIGS. 3A and 3B. The steps associated with detecting a non-active port or an active port can be performed by the corresponding switch port 12, or may be centralized within the controller 20, for example, where MAC functionality is shared across multiple switch ports 12.

Figure 2:
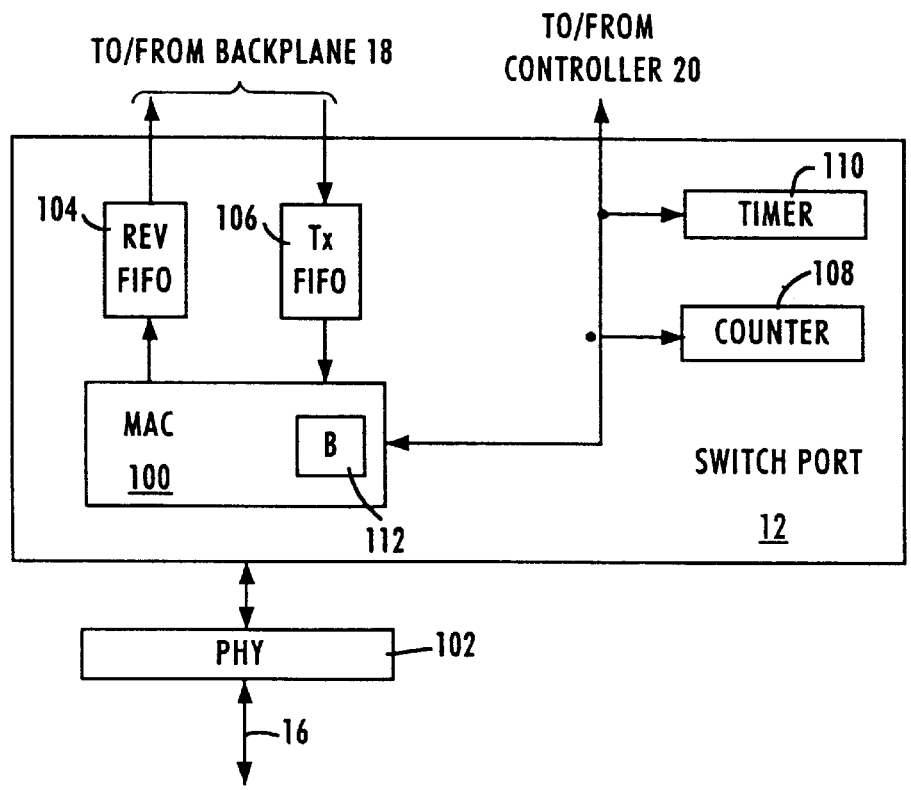
FIG. 2 is a diagram illustrating in detail one of the switch ports of FIG. 1.

FIG. 2 illustrates an exemplary switch port 12. Each port 12 includes a media access control (MAC) 100, a receive FIFO 104, a transmit FIFO 106, a counter 108, and a timer 110. The media access controller (MAC) 100, which operates in full-duplex mode according to IEEE 802.3x protocol, receives data packets from a physical layer (PHY) transceiver 102, which is typically implemented as a device external to the switch 10. Alternatively, the physical layer transceiver 102 may be integrated on a chip as part of the network switch 10. The MAC 22 receives data packet from the media 16 via the physical layer device 102, and forwards the received data packets to a receive FIFO 104.

Similarly, the MAC 100 forwards transmit data from the transmit FIFO 106 onto the media 16 via the physical layer device 102. The MAC 100 also includes a register 112 for storing the assigned port bandwidth assigned by the controller 20. Hence, the MAC 100, upon receiving the assigned bandwidth (B) from the controller 20, outputs the assigned bandwidth value to the corresponding network node 14 and stores the assigned bandwidth value in the register 112, enabling the MAC 100 to determine when a data packet is to be received from the corresponding network node 14, described below.

As shown in FIG. 4, each port 12 performs the detection of a non-active port by first receiving a packet from the corresponding network node in step 120, and using the associated counter 108 to determine the size of the received data packet. For example, the counter 108 may be configured to count the number of bytes (or bits) of the received data packet. The MAC 100 then starts the timer 110 once the entire data packet has been received by the switch port 12 in step 122. Initiation of the timer 110 in step 122 enables the port 12 to monitor the interpacket delay interval between the first data packet received in step 120 and a subsequent data packet received from the corresponding network node 14. The MAC 100 calculates in step 124 the expected delay (D) to be used by the corresponding network node 14 to achieve the assigned network transmission rate according to the assigned bandwidth value and the size of the received data packet (S). For example, assuming switch port 12a and the corresponding network node 14a had an assigned bandwidth value of B=75 Mb/s where the wire rate of the network media 16a was R=100 Mb/s, then the delay would be calculated as D=(S) (R/B−1), or D=0.33S, where the delay units would be bit times or byte times.

The MAC 100 then checks in step 126 if the calculated delay (D) is less than the minimum interpacket gap of 96 bit times specified by IEEE 802.3 protocol. If the calculated delay (D) is less than the minimum interpacket gap, then the MAC 100 resets the expected delay (D) in step 128 to the minimum interpacket gap of 96 bit times according to IEEE 802.3 protocol.

The MAC 100 then checks if a new data packet is received from the corresponding network node 14 within the expected delay interval D. Specifically, if the MAC 100 detects that no data packet has been received in step 130, the MAC 100 checks in step 132 if the timer 110 has reached the expected delay interval D. If the MAC 100 determines that a new data packet is not received from the corresponding network node 14 upon expiration of the delay interval (e.g., the value of the timer 100 equal the calculated delay D), the MAC 100 sets an internal flag readable by the controller 20 to determine the port as non-active in step 134. Alternatively, the MAC 100 may send a management control frame to the controller 20.

Hence, each network node 14 sending a data packet is expected to send another packet after an interpacket gap that is proportional to the length of the data packet and the assigned bandwidth value (i.e. the assigned network rate). Since each corresponding switch port 12 is aware of the rate that the corresponding network node 14 is allowed to transmit, the switch port 12 uses a similar delay calculation mechanism that counts the number of bytes (or bits) in the packet to start the timer 110 for the interpacket gap for the calculated interval. If the timer 110 expires (e.g., exceeds the calculated delay) and there is no received packet or start of packet arrival at the input port 12, then the port is considered to be non-active. The controller 20 will then recalculate the bandwidth for each of the remaining active ports taking into account the bandwidth not being used by the non-active port.

Hence, the detection of a non-active port is based upon the size of the previously-received data packet and the assigned transmission rate. This detection arrangement is particularly advantageous in avoiding an erroneous detection of a non-active port because the determination of whether a port 12 is active or non-active is based upon the flow of data from the corresponding network node 14. In contrast, a round-robin polling arrangement internal to the switch, which is not synchronized to the operation of the corresponding network node 14, may erroneously deem a port as non-active if a packet is not detected within a round-robin cycle.

A network switch port 12 is determined active when the switch port receives a data packet from the corresponding network node 14. As described above, a port 12 maintains an active status if the port 12 begins to receive a data packet before the delay timer 110 counting the inter-frame spacing reaches the calculated delay (D). In addition, a port 12 deemed an non-active port may be deemed to have a change in status to an active port upon having a received data packet in the corresponding receive FIFO 104.

Figure 5:
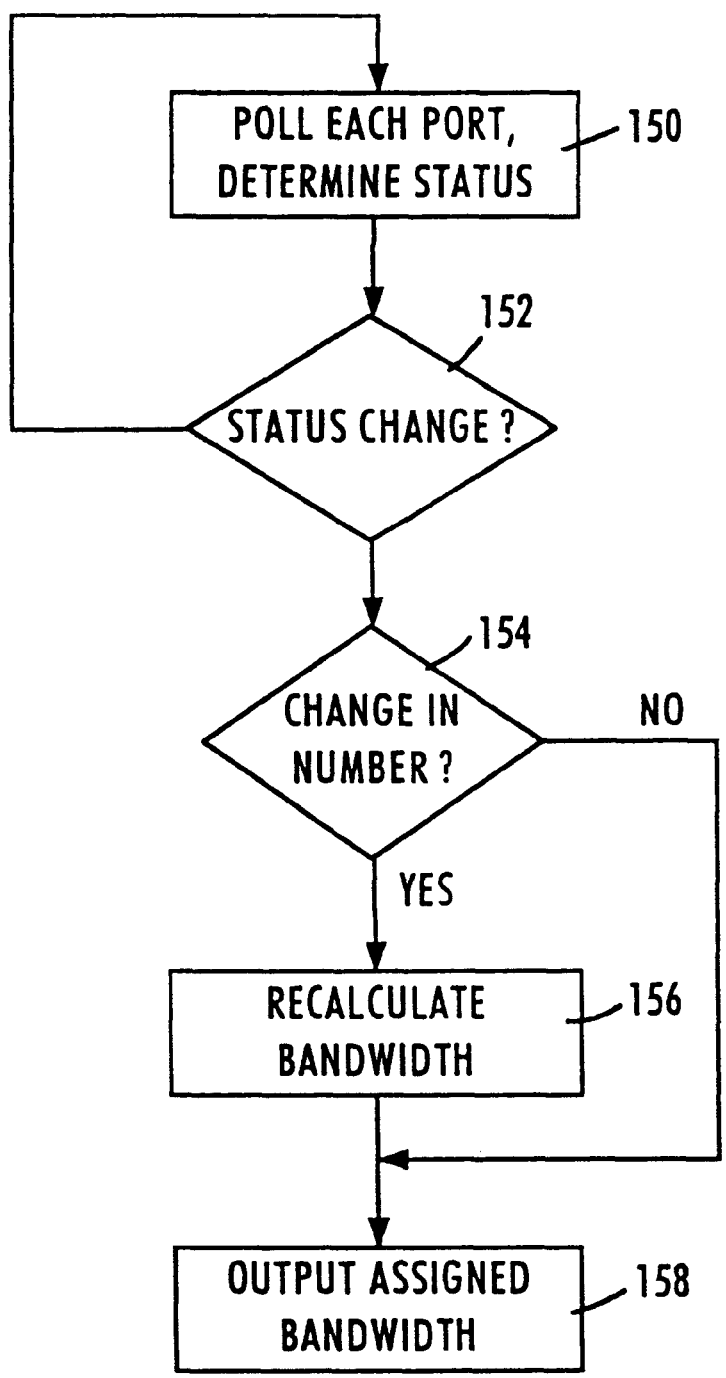
FIG. 5 is a flow diagram illustrating the steps of detecting an active port.

FIG. 5 is a flow diagram illustrating one arrangement for determining whether a port 12 is active. As shown in FIG. 5, the controller 20 polls each port 12 at constant intervals in step 150 to determine the status of the corresponding port 12. The polling interval in step 150 is dependent on the size of the receive FIFO 104 for each input port. Hence, the smaller the size of the receive FIFO 104, the shorter the interval (e.g., the greater the frequency per unit time). After the controller 20 has polled all the switch ports 12 in step 150, the controller 20 determines if there is a change in status in any of the ports 12 in step 152. If the controller 20 determines a change in the status, the controller checks in step 154 if there is a change in the number of active ports. If the controller 20 detects the change in the number of active ports, then the controller 20 recalculates the assigned bandwidth value for the respective active ports in step 156, and outputs the assigned bandwidth values in step 158 to the respective ports 12. As described above, the active ports in turn store the assigned bandwidth values in the respective registers 112, and output the assigned bandwidth values within MAC control frames to the respective network nodes 14, causing the network nodes to transmit data packets according to the recalculated assigned bandwidth values.

The arrangement of FIG. 5 is particularly advantageous because each of the current active nodes maintain the assigned bandwidth value at the time a non-active port is detected as having data. Hence, although a non-active port cannot immediately switch a received data packet to a destination output port, other remaining nodes 14 maintain the negotiated quality of service.

An alternative arrangement for detecting an active port switches a received data packet as soon as the input port 12 is polled by the controller 20 according to a round-robin arrangement. Upon detecting the additional active port, the controller 20 will reallocate the bandwidth among the active ports.

According to the present invention, a network switch dynamically allocates bandwidth among switch ports based on the capacity of the network switch and the number of active ports. The allocation of bandwidth may be evenly distributed across the active ports, or may be adjusted for priority applications, enabling quality of service to be built into network switches. The dynamic reallocation of available bandwidth also enables the size of the received FIFOs for each switch port to be optimally sized. The disclosed arrangement also allows building of switch fabric whose capacity does not need to scale linearly as a product of number of ports and port speed. Hence, the disclosed arrangement is particularly beneficial for higher-speed networks, such as 1000 Mb/s link networks.

Although the disclosed embodiments illustrate a port having its own timer and counter, it will be appreciated that the functionality for the ports may be centralized within the controller, or that different operations may be shared as a shared state machine to minimize hardware. In addition, the disclosed controller may be implemented as a separate management agent controlling the network switch.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

We claim:

1. In a network switch having network ports, a method of controlling transmission of data packets by network nodes in communication with the respective network ports, comprising:

detecting active ports among the network ports;

determining assigned bandwidth values for the respective active ports based on a number of the active ports and a capacity of the network switch: and outputting the assigned bandwidth values to the network nodes served by the respective active ports, the output assigned bandwidth values causing the network nodes served by the respective active output ports to operate according to the respective assigned bandwidth values, wherein the detecting step comprises determining one of the active ports to become a non-active port, the assigned bandwidth values determining step comprises recalculating the assigned bandwidth values for the remaining respective active ports in response to the one active port becoming said non-active port, and the non-active port determining step comprises determining a length of a first packet received by the one active port from the corresponding network node, calculating a delay interval based on the assigned bandwidth value for the corresponding network node and the determined length of the first packet, and determining, following the delay interval after reception of the first packet, a presence of another data packet received by the one active port from the corresponding network node.

2. The method of claim 1, wherein the non-active port determining step further comprises designating the one active port determined as said non-active port if the another data packet is not received by the one active port by expiration of the delay interval after reception of the first packet.

3. The method of claim 2, wherein the detecting step further comprises determining the presence of a received data packet at each of the network ports at a prescribed interval based on a corresponding network port buffer size.

4. The method of claim 2, wherein the detecting step further comprises sequentially monitoring each of the network ports in a prescribed order.

5. In a network switch having network ports, a method of controlling transmission of data packets by network nodes in communication with the respective network ports, comprising:

detecting active ports among the network ports;

determining assigned bandwidth values for the respective active ports based on a number of the active ports and a capacity of the network switch; and outputting the assigned bandwidth values to the network nodes served by the respective active ports, the output assigned bandwidth values causing the network nodes served by the respective active output ports to operate according to the respective assigned bandwidth values, wherein the detecting step comprises determining one of the active ports to become a non-active port, the assigned bandwidth values determining step comprises recalculating the assigned bandwidth values for the remaining respective active ports in response to the one active port becoming said non-active port, and the non-active port determining step comprises:

counting in a counter a number of bytes in a first packet received by the one active port from the corresponding network station, calculating a delay interval based on the assigned bandwidth value for the corresponding network node and the determined length of the first packet, starting a timer upon completed reception of the first packet from the corresponding network node, and determining a presence of another data packet received by the one active port from the corresponding network node in response to the timer having reached the calculated delay interval.

6. A method in a network switch comprising:

monitoring switch ports in the network switch for data packets received from the respective network nodes:

selectively determining a group of the switch ports to be designated as active ports based on the monitoring of the data packets; and selectively allocating switch bandwidth among the active ports based on a number of the active ports and a capacity of the network switch, wherein the monitoring step for each of said switch ports comprises determining if said each switch port is non-active, including determining a length of a first packet received from the corresponding network node;

calculating a corresponding delay interval based on the corresponding allocated switch bandwidth for said each switch port and the determined length of the corresponding first packet; and determining a presence of another data packet received from the corresponding network node after the corresponding delay interval following reception of the corresponding first packet, said each switch port designated as non-active if at least a portion of said another data packet is not received by expiration of the corresponding delay interval following reception of the first packet.

7. The method of claim 6, wherein the monitoring step further comprises determining for each designated non-active switch port a presence of a received data packet at a prescribed interval based on a corresponding network port buffer size.

8. A network switch comprising:

a plurality of network ports configured for sending and receiving data frames to and from respective network nodes:

a receive buffer configured for storing a data frame received from at least one of the network ports, the network switch configured for outputting the stored data frame to a selected one of the network ports according to a prescribed switch capacity;

a controller configured for determining assigned bandwidth values for respective selected network ports, designated as active ports, based on activity detected on the network ports and the prescribed switch capacity;

a counter configured for counting a size of a first data frame received by a selected network port from the corresponding network node; and a programmable timer configured for counting a time interval following reception of the first data frame based on the size of the first data frame and the corresponding assigned bandwidth value for the selected network port; wherein the controller designates the selected network port as non-active based on the selected network port not having received at least a portion of a packet from the corresponding network node by expiration of the programmable time.

9. The network switch of claim 8, further comprising a plurality of said receive buffers for the respective network ports, wherein the controller polls the non-active network port for a received data packet at prescribed intervals based on a size of the corresponding receive buffer, the controller redesignating the non-active port as one of said active ports and determining new assigned bandwidth values for the active ports in response to detection of the received data packet.

10. The network switch of claim 8, further comprising a plurality of said receive buffers for the respective network ports, wherein the controller polls the non-active network port for a received data packet based on a prescribed sequential order for the network ports, the controller redesignating the non-active port as one of said active ports and determining new assigned bandwidth values for the active ports in response to detection of the received data packet.

11. The network switch of claim 8, wherein the controller determines the assigned bandwidth values based upon a prescribed priority of the network ports.

* * * * *